July 26, 1932. C. B. COATES 1,868,626
SHOCK ABSORBING HANDLE
Filed Feb. 4, 1928
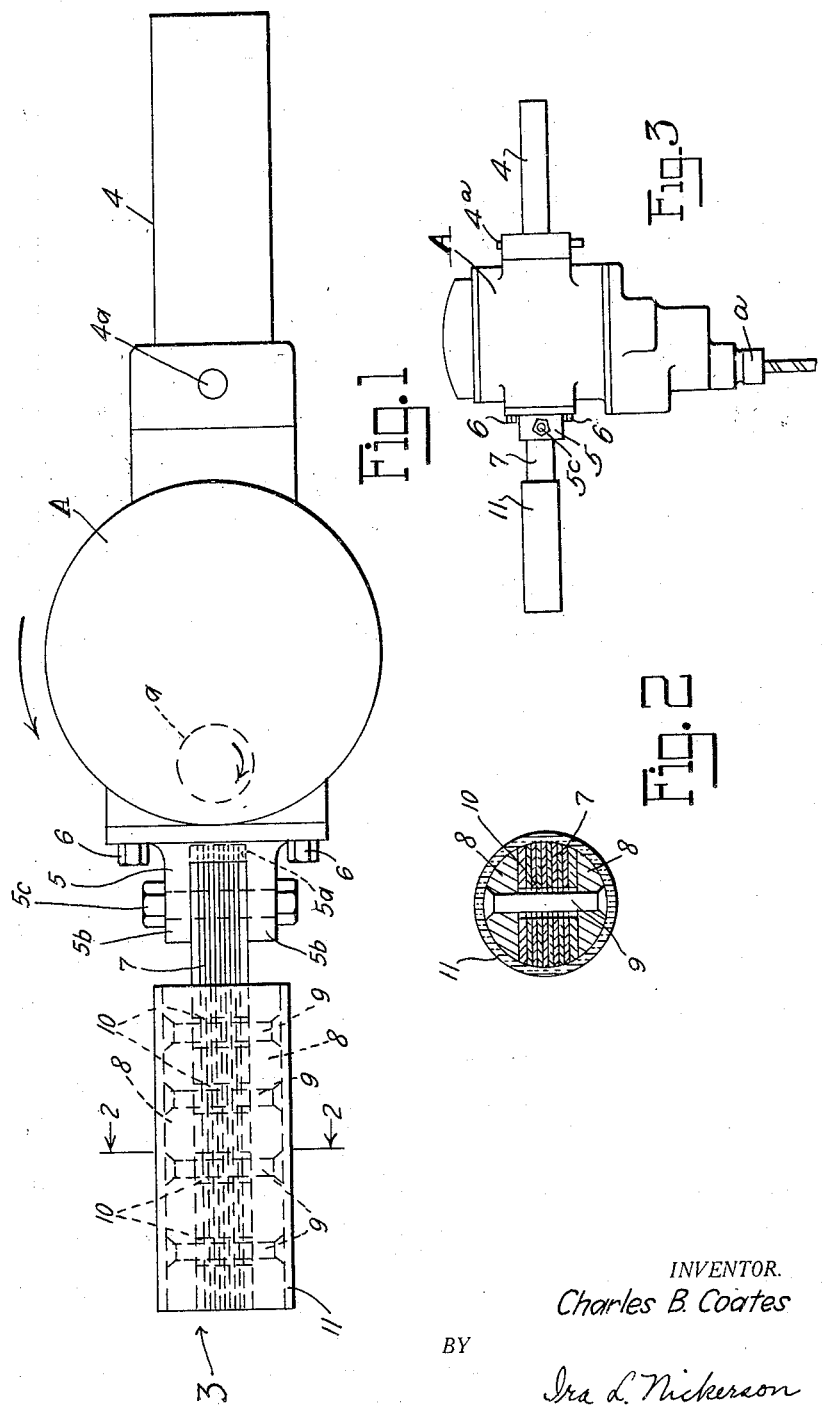
INVENTOR.
Charles B. Coates
BY
Ira L. Nickerson
ATTORNEY.

Patented July 26, 1932

1,868,626

UNITED STATES PATENT OFFICE

CHARLES B. COATES, OF CLEVELAND, OHIO, ASSIGNOR TO CHICAGO PNEUMATIC TOOL COMPANY, OF NEW YORK, N. Y., A CORPORATION OF NEW JERSEY

SHOCK ABSORBING HANDLE

Application filed February 4, 1928. Serial No. 251,805.

This invention relates to power tools of the portable or hand-operated type, and particularly to the handles by which such tools are supported. More specifically it concerns handle attachments for power tools used for stud setting, nut running, screw driving and similar operations.

A principal object of the invention is to relieve the operator of such a tool of at least a part of the severe shock or recoil which he experiences when the securing member is driven home and the torque of the tool is transmitted back to the operator. Other objects will be apparent from the detailed description, which follows:

In order to illustrate the invention, one concrete embodiment thereof is shown in the accompanying drawing in which:

Fig. 1 is a plan view;

Fig. 2 is a transverse sectional view substantially on the line 2—2 of Fig. 1; and Fig. 3 is a side elevational view on a reduced scale of the complete tool.

In the embodiment of the invention chosen for the purpose of illustration a portable power tool of any suitable or desired type is indicated at A the same being arranged to operate a rotatable spindle, diagrammatically indicated at $a$. The tool is arranged to be manually supported, the means for this purpose being adapted to relieve the operator of the tool of at least a portion of the shock due to the sudden stopping of the rotation of spindle $a$ such as results when the securing member driven by the spindle "bottoms" or is driven home. One or more handles may be provided as desired. In the present instance, opposed handles 3 and 4 are illustrated, 3 being a handle arranged to yield in a plane transverse to the axis of spindle A and handle 4 being rigid and adapted to control the motor of the power tool A. Handle 4 may be a throttle handle if an air motor is used for tool A or may be provided with a control switch $4a$ if the tool has an electric motor.

The yielding handle 3 comprises a base 5 secured to tool A in any suitable manner, as by screw bolts 6. Extending from base 5 and suitably secured to the latter are a series of flat springs 7 forming a laminated body. The free ends of springs 7 are arranged to be gripped by the operator and by preference carry plates 8, generally semicircular in cross section as indicated in Fig. 2 and of any suitable material such as wood, fibre, or the like. Plates 8 are secured to each other and to springs 7 by rivets 9 passing through bores 10 in springs 7, which bores are of somewhat greater diameter than rivets 9 in order to permit relative movement of the springs when handle 3 is flexed. The contour of the side of springs 9 may be rounded to conform to that of plates 8 as indicated at Fig. 2 and a sleeve 11 of suitable material such as rubber may be applied thereover to be gripped by the hand of the operator. As indicated in Fig. 1, springs 7 extend into a recess $5a$ in base 5, which recess may be formed at least partly by projecting ears $5b$, a bolt $5c$ extending through perforations in ears $5b$ and through aligned bores in springs 7 securely to hold the latter in recess $5a$. The laminated spring connection of yielding handle 3 to tool A is so arranged that the yielding action is in a plane transverse to the axis of spindle $a$. The direction of rotation of spindle is indicated by the small arrow, and the reaction of the tool when spindle is stopped by the work, is indicated by the large arrow. The shock of the sudden reaction of the tool when spindle $a$ is stopped or suddenly retarded is taken by yielding handle 3 and absorbed by the flexing of springs 7 and by the friction developed by the relative movement permitted by bores 10 while the springs are held rather tightly together between plates 8 by rivets 9.

While a preferred form of the invention has been herein shown and described it is to be understood that the invention is not limited to the exact details thereof but covers all changes, modifications, and adaptations within the scope of the appended claims.

I claim as my invention:

1. A spring handle for portable power tools comprising a base for attachment to the tool, said base having a recess, springs forming a laminated body seated in said recess and projecting therefrom, a bolt on said base extending across said recess and passing through aligned bores in said springs, and grip means upon the free ends of said springs securing the same together but permitting limited relative movement.

2. A spring handle for portable power tools comprising a base for attachment to the tool, springs forming a laminated body extending from said base, and grip means on the free ends of the springs comprising plates on opposite sides of said body, securing members for said plates extending through bores therefor in said springs, said bores being of somewhat greater diameter than said members to permit free relative movement of said spring.

3. In combination, a portable power tool having on one side a recess and parallel ears defining a part of the recess, flat springs forming a laminated handle body extending into said recess and arranged to flex in a direction transverse to the axis of the tool, a retaining member extending through said ears and said body to secure the latter to said tool, and grip means over the free ends of said springs to hold the same in assembled relation but to permit limited relative movement during flexing.

Signed by me at Cleveland, in the county of Cuyahoga and State of Ohio this 1st day of February, 1928.

CHARLES B. COATES.